United States Patent [19]

Yashiro et al.

[11] Patent Number: 4,621,264

[45] Date of Patent: Nov. 4, 1986

[54] METHOD AND APPARATUS FOR MEASURING WATER LEVEL IN A WELL

[75] Inventors: Hirokatsu Yashiro; Jiro Ohno, both of Kawasaki, Japan

[73] Assignee: Nippon Steel Corporation, Tokyo, Japan

[21] Appl. No.: 647,181

[22] Filed: Sep. 4, 1984

[30] Foreign Application Priority Data

Sep. 7, 1983 [JP] Japan .................. 58-164569

[51] Int. Cl.$^4$ .................. G01S 13/08; G01V 3/08; G01V 3/12
[52] U.S. Cl. .................. 342/124; 324/333
[58] Field of Search .............. 343/5 DP, 5 FT, 5 NA, 343/12 A, 12 R; 324/333, 325, 338, 346, 355–357, 360, 368–369

[56] References Cited

U.S. PATENT DOCUMENTS

| | | | |
|---|---|---|---|
| 3,195,103 | 7/1965 | Drenkelfort | 343/5 DP |
| 3,412,321 | 11/1968 | Unterberger et al. | 324/338 |
| 3,577,143 | 4/1969 | Poirier et al. | 343/12 R |
| 4,509,049 | 4/1985 | Haendel et al. | 343/12 A |

FOREIGN PATENT DOCUMENTS 50-144604 11/1975 Japan .

Primary Examiner—Thomas H. Tarcza
Assistant Examiner—Bernarr Earl Gregory
Attorney, Agent, or Firm—Kenyon & Kenyon

[57] ABSTRACT

A method for measuring the water level in a well including the steps of radiating an electromagnetic wave to a gap between a boring drill rod and a casing pipe by using a transmitting antenna, receiving the electromagnetic wave reflected by a surface of the water level in the casing pipe by using a receiving antenna; then measuring a distance between the surface of the water level and the receiving antenna based on the going and returning time of the electromagnetic wave.

20 Claims, 12 Drawing Figures

METHOD AND APPARATUS FOR MEASURING WATER LEVEL IN A WELL

BACKGROUND OF THE INVENTION

1. Field of the Invention

The present invention relates to a method and apparatus for measuring the water level in a well during drilling of the same. The present invention is advantageously used in drilling of geothermal or oil wells and enables easy, precise measurement of the depth of the water surface from the ground.

2. Description of the Prior Art

Drilling of geothermal, oil, and other wells is generally performed by driving a boring drill rod bearing a rotating bit at its end into the ground while injecting muddy water (slime). The muddy water is recovered from the well at the ground. Under normal conditions, i.e., when the drilling is progressing smoothly, the muddy water fills in the well and has a water level equal to the ground surface. The muddy water is necessary for smoothly drilling and conveying the crushed rock, but is a special liquid and thus is relatively expensive. Accordingly, it is very important to measure the water level of muddy water when drilling.

When the drilling bit encounters a crack in the stratum in drilling, the muddy water is absorbed through the crack and the water level suddenly descends a few hundred meters from the ground, emptying the upper part of the well. If such a crack lies before the desired stratum of geothermal vapor or oil, it is necessary to close the crack to allow the water level to be restored and thus prevent seizure of the drilling pipe by rock scraps in the well. There are two steps in this operation. First, so-called lost circulation materials (LCM), generally cottonseed, are poured into the crack from an inner pipe of the drilling pipe. Next, the crack is closed with cement provided around an outer pipe. For this operation, however, it is necessary to determine the exact position of the crack. This is found from the level of the remaining muddy water.

Conversely, if the crack lies in the desired stratum of geothermal vapor or oil, it is not desired to fill the crack with muddy water. Therefore, after such a crack is encountered, drilling is continued using relatively low cost clear water at an insufficient water level instead of muddy water at the ground level. Under such abnormal conditions, it is necessary to monitor the water level because if the water level falls too much, the water might become too hot, boil, and suddenly blow out from the well.

The conventional method for measuring the water level in a well, as disclosed, for example, in Japanese Unexamined Patent Publication (Kokai) No. 50-144604, involves pulling up the boring drill rod, lowering a stratum detection apparatus consisting of a plurality of electrodes mounted to the ends of different wires, and detecting the current flowing between one electrode and another when dipped into the water.

During this measurement, however, it is necessary to stop the drilling. Consequently, the conventional method for measuring the water level requires much time and labor. Moreover, much valuable information is lost because of the water level changes when drilling is stopped. No method is known in the prior art for measuring the water level in the well while continuing the drilling.

SUMMARY OF THE INVENTION

The primary object of the present invention is to provide a method and apparatus for measuring the water level in a well.

Another object of the present invention is to provide a method and apparatus enabling easy and highly precise measurement of the water level while continuing drilling.

Still another object of the present invention is to provide a method and apparatus enabling easy and highly precise measurement without using wires and electrodes.

In accordance with the present invention, there is provided a method for measuring a water level in a well, including the steps of radiating an electromagnetic wave to a gap between a boring drill rod and a casing pipe by using a transmitting antenna; receiving the electromagnetic wave reflected by a surface of the water level in the casing pipe by using a receiving antenna; and measuring a distance between the surface of the water level and the receiving antenna based on the going and returning time of the electromagnetic wave.

Further, there is provided an apparatus for measuring a water level in a well including a transmitting antenna mounted to the top of a casing pipe in a gap between a boring drill rod and the casing pipe; a receiving antenna mounted to the opposite side of the transmitting antenna in the gap; a transmitter-receiver electrically connected to the transmitting antenna and the receiving antenna for transmitting and receiving the electromagnetic wave; a spectrum analyzing means for analyzing mixed transmitted and received electromagnetic waves; and a recording means for recording analyzed data.

Still further, there is provided an apparatus for measuring a water level in a well including a transmitting electrode mounted to a boring drill rod; a receiving electrode mounted to a casing pipe; a pulse oscillator for generating a pulse-modulated electromagnetic wave; a spectrum analyzing means for measuring a delay time between a transmitted pulse and received pulse; and a recording means for recording measured data.

In accordance with the present invention, the depth of the water level in geothermal wells, oil wells, and the like from the ground surface can be easily and precisely measured while continuing drilling.

DESCRIPTION OF THE PREFERRED EMBODIMENTS

Figure 1:
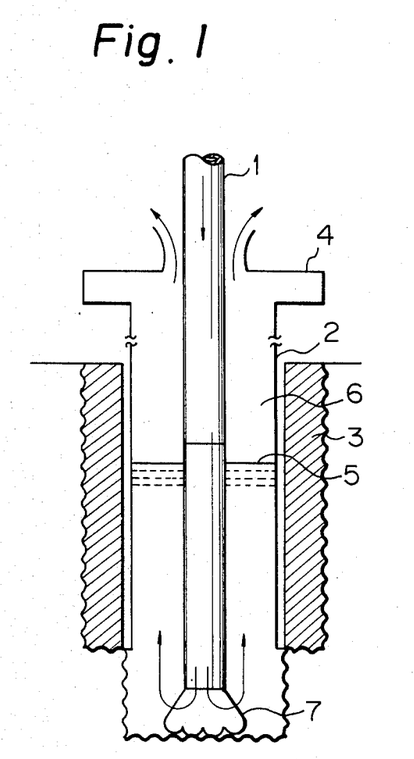
FIG. 1 is a schematic sectional view of the structure of a geothermal well.

FIG. 1 is a schematic sectional view for explaining the structure of the geothermal well. Referring to FIG. 1, a geothermal well is basically constituted by a double pipe, i.e., an inner pipe 1 of a boring drill rod mounted with a drilling bit 7 at its end and an outer pipe 2 of a casing pipe fixed with cement 3 around it. The cement 3 is used for preventing the collapse of the well and the leakage of high temperature geothermal vapor from the ground. Muddy water is poured into the top of the inner pipe 1 and overflows from a blowout preventer 4 mounted to the top of the outer pipe 2 through the drilling bit and a gap 6 between the inner pipe 1 and outer pipe 2. Reference numeral 5 indicates the water level.

Figure 2:
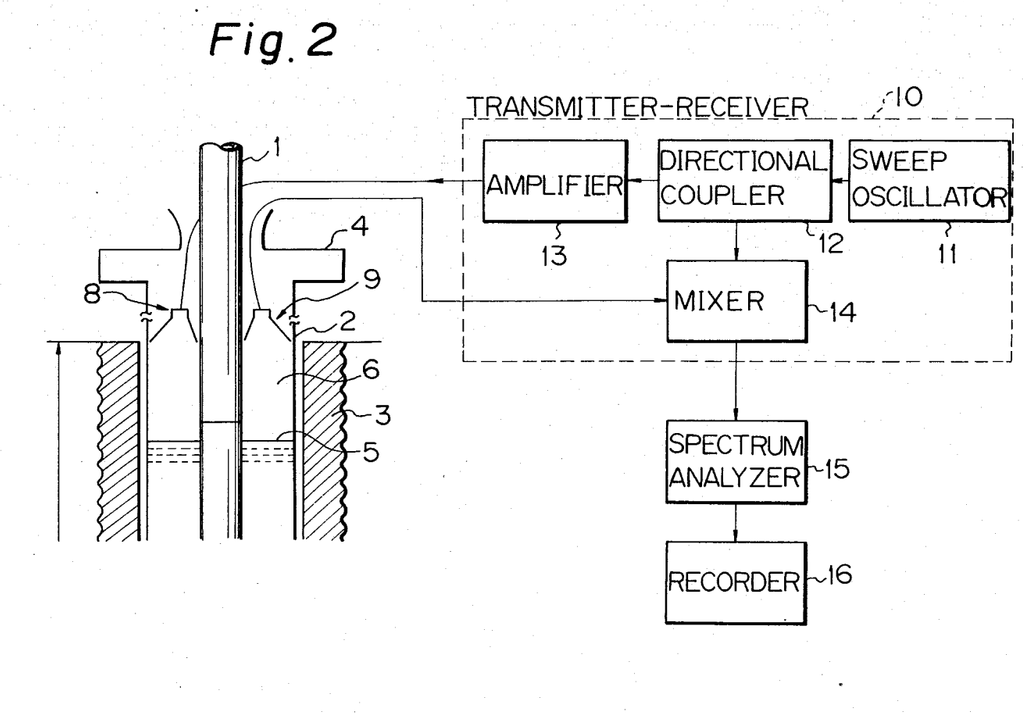
FIG. 2 is a schematic block diagram of an apparatus for measuring a water level in a well according to an embodiment of the present invention.

Referring to FIG. 2, an apparatus for measuring the water level in a well according to an embodiment of the present invention comprises a transmitting horn antenna 8 mounted at the gap 6 between the inner pipe 1 and the outer pipe 2 at the top of the outer pipe 2, a receiving horn antenna 9 mounted at the opposite side of the transmitting horn antenna 8, a transmitter-receiver 10 consisting of a sweep oscillator 11, directional coupler 12, amplifier 13, and mixer 14, a spectrum analyzer 15 connected to the mixer 14, and a recorder 16.

A frequency-modulated electromagnetic wave transmitted from the transmitter-receiver 10 is radiated from the transmitting horn antenna 8 to the gap 6. Namely, in the transmitter-receiver 10, the frequency-modulated electromagnetic wave generated by the sweep oscillator 11 is split into two electromagnetic waves by the directional coupler 12. One electromagnetic wave is transmitted to the mixer 14, and the other electromagnetic wave is transmitted to the transmitting horn antenna 8 via the amplifier 13 and radiated to the gap 6. The radiated electromagnetic wave is propagated in the gap 6, reflected from the surface of the water level 5, and received by the receiving horn antenna 9. The received electromagnetic wave is transmitted to the mixer 14.

Figure 3:
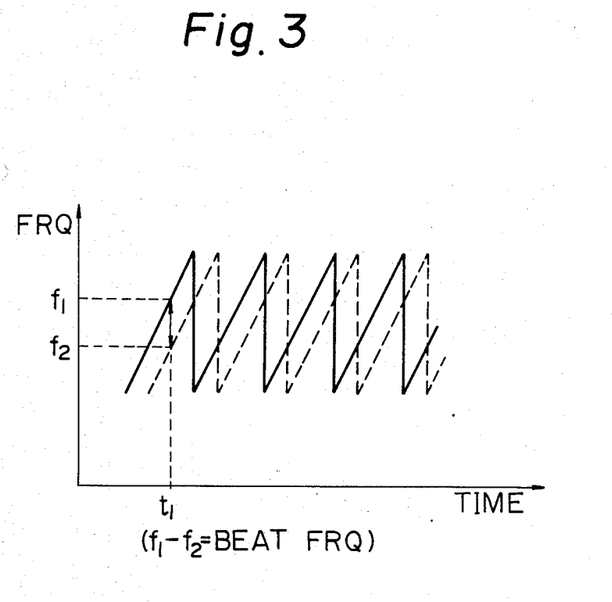
FIG. 3 is a graph for explaining the differential frequency (beat frequency) between a transmitted wave and a received wave.
Figure 9:
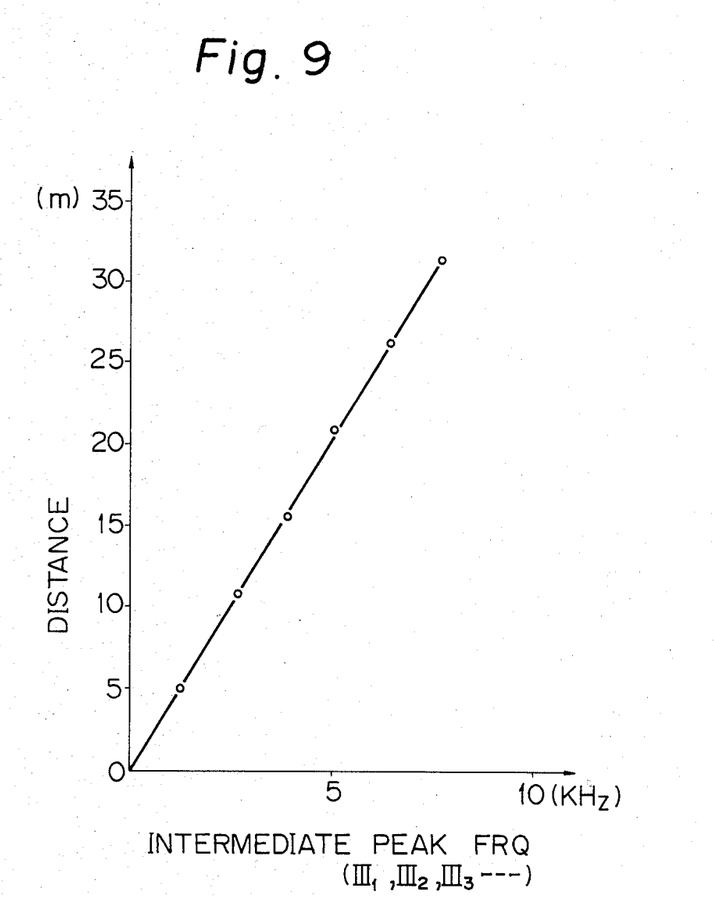
FIG. 9 is a graph for explaining the relation between the distance of the water level and the intermediate peak frequency.

The relation between the frequency-modulated wave transmitted from the sweep oscillator 11 and the wave received in the mixer 14 is shown in FIG. 3. Referring to FIG. 3, the ordinate indicates frequency and the abscissa time. The solid line indicates a wave having a sawtooth waveform transmitted from the sweep oscillator 11, and the dotted line indicates the wave received in the mixer 14 via the receiving horn antenna 9. As understand from the drawing, in the mixer 14, the frequency of the wave transmitted via the directional coupler 12 is $f_1$ and the frequency of the received wave is $f_2$ at the same time $t_1$. The difference between the frequency $f_1$ and $f_2$, i.e., the beat frequency, increases in proportion to the distance between the receiving horn antenna 9 (namely, transmitting horn antenna 8) and the water level 5. One example of this relation is shown in FIG. 9, explained later.

Accordingly, it is possible to measure the water level by analyzing the beat frequency, i.e., intermediate frequency, at a receiver using the spectrum analyzer 15 and by recording it with the recorder 16.

Figure 4:
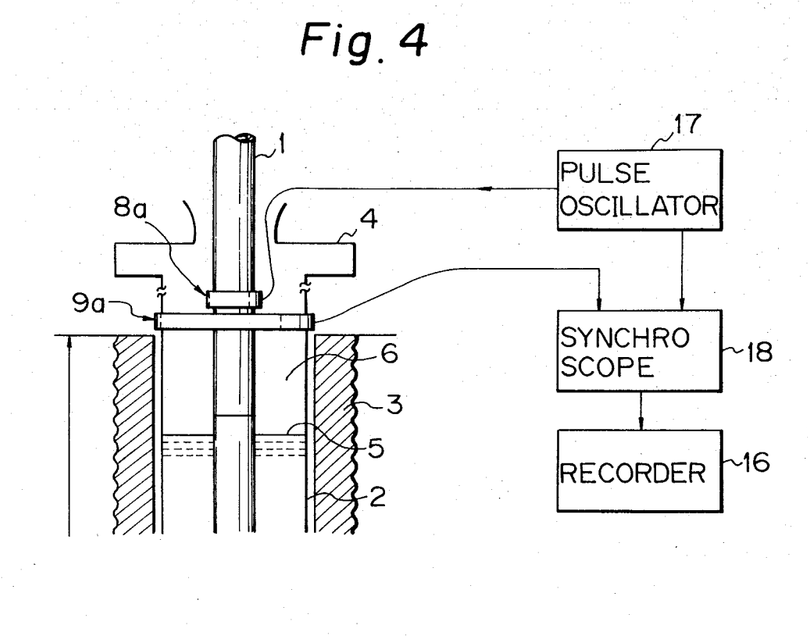
FIG. 4 is a schematic block diagram of an apparatus for measuring the water level in a well according to another embodiment of the present invention.

Another embodiment of the present invention is shown in FIG. 4. Referring to FIG. 4, the apparatus for measuring the water level in a well comprises a plus side transmitting electrode 8a mounted to the inner pipe 1, a minus side receiving electrode 9a mounted to the outer pipe 2, a pulse oscillator 17, a synchroscope 18, and the recorder 16.

A positive pulse having a pulse width of about 30 ns is generated by the pulse oscillator 17 and transmitted to the transmitting electrode 8a, which has a positive potential. The transmitting electrode 8a radiates the positive pulse to the gap 6. The pulse reflected by the surface of the water level 5 is received by the receiving electrode 9a, which has a negative potential, as a negative pulse. The received negative pulse is transmitted to the synchroscope 18. Simultaneously, a trigger pulse is transmitted from the pulse oscillator 17 to the synchroscope 18 in order to synchronize the transmitted pulse and received pulse. Accordingly, it is possible to measure the going and returning time, i.e., delay time between transmitted pulse and received pulse by using the trigger pulse. The distance between the electrode 8a (9a) and the water level can be determined from this by calculation.

Figure 5A:
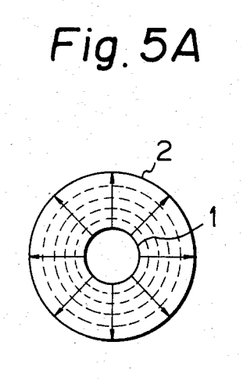
FIG. 5A illustrates an electromagnetic field of a transverse electromagnetic (TEM) mode.

Below, an explanation will be given of the propagation of the electromagnetic wave in the gap 6. The double-pipe structure shown in FIG. 1 is similar to the well-known circular coaxial waveguide for propagating an electromagnetic wave. Generally, when an electromagnetic wave propagates in the double-pipe structure shown in FIG. 1, if the wavelength of the electromagnetic wave is large compared with the diameters of the two pipes, the mode of the electromagnetic wave is determined by only one mode, i.e., the TEM mode shown in FIG. 5A. As shown in FIG. 5A, in the TEM mode, the electric field (solid lines) acts in the radial direction, while the magnetic field (dotted lines) acts in the circumferential direction.

Figure 5B:
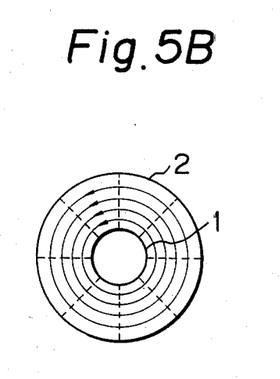
FIG. 5B illustrates an electromagnetic field of a transverse electric (TE) mode, particularly a $TE_{01}$ mode.

However, the shorter the wavelength of the electromagnetic wave, the more varied the propagation modes in the double pipe. For example, when the outer diameter of the inner pipe 1 is 114 mm and the inner diameter of the outer pipe 2 is 319 mm, an electromagnetic wave having a frequency of 450 MHz can be propagated by only the TEM mode, but an electromagnetic having a frequency beyond 450 MHz can be propagated by various propagation modes. Especially, when the frequency of the electromagnetic wave is beyond 1.6 GHz, the electric field acts in the circumferential direction, while the magnetic field acts in the radial direction. This mode is called the $TE_{01}$ mode and is shown in FIG. 5B.

When an electromagnetic wave is propagated in the double pipe, attenuation of the electromagnetic wave inevitably occurs due to the high frequency resistance of the inner surface of the pipe. When measuring a deep water level, it is desirable to minimize this attenuation and to use a mode with only very small unnecessary reflections caused by joint portions of the pipe. It is preferable to use the $TE_{01}$ mode for the above-mentioned case.

Experiments show that when the inner surface of the pipe is considerably rusted, the attenuation at the $TE_{01}$ mode is minus 0.5 dB per meter and that at the TEM mode is minus 13 dB per meter. Moreover, reflection of the electromagnetic wave from the joints of the inner surface considerably increases in the TEM mode, but is nonexistent in the same portions in the $TE_{01}$ mode.

Figure 6:
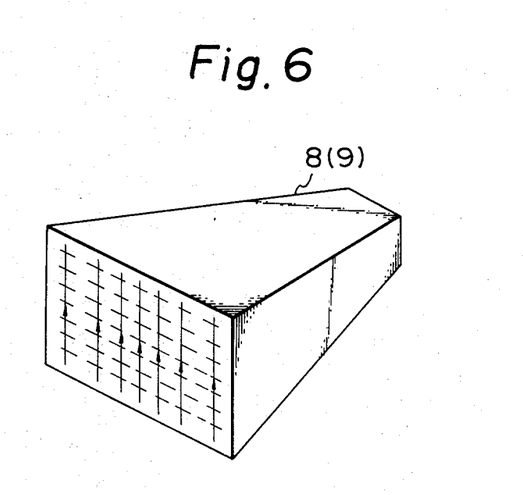
FIG. 6 is a schematic perspective view of a typical horn antenna and illustrates an electromagnetic field mode thereof.

Accordingly, for efficiently propagating the $TE_{01}$ mode, the transmitting horn antenna 8 and the receiving horn antenna 9 must be positioned so that the electric fields of the two antennas act in the circumferential direction of the pipe. FIG. 6 illustrates the electromagnetic field of a typical rectangular horn antenna. This figure explains that the TEM or $TE_{01}$ mode can be obtained by changing the direction of this horn antenna by 90°.

Figure 7A:
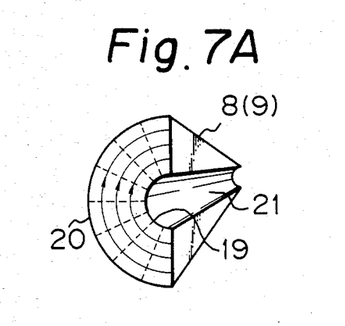
FIG. 7A is a schematic perspective view of a horn antenna according to an embodiment of the present invention.
Figure 7B:
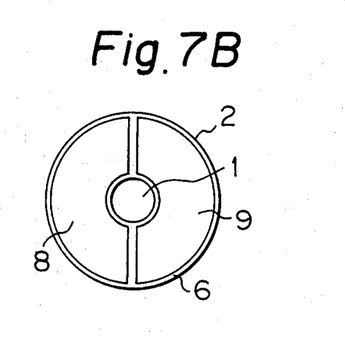
FIG. 7B is a bottom view of the horn antenna shown in FIG. 7A.

FIG. 7A is a perspective sectional view of a horn antenna used as the transmitting and receiving antenna according to an embodiment of the present invention. FIG. 7B is a bottom view of the horn antenna shown in FIG. 7A. As understood from the drawings, the transmitting horn antenna 8 (or 9) is constituted as a half cone shape having a coaxial groove 21. The shape of the opening portion of the horn is adapted to the pattern of the gap 6, as shown in FIG. 7B. Accordingly, both radii of curvatures 19 and 20 are adapted to both radii of the inner pipe 1 and the outer pipe 2.

Figure 8A:
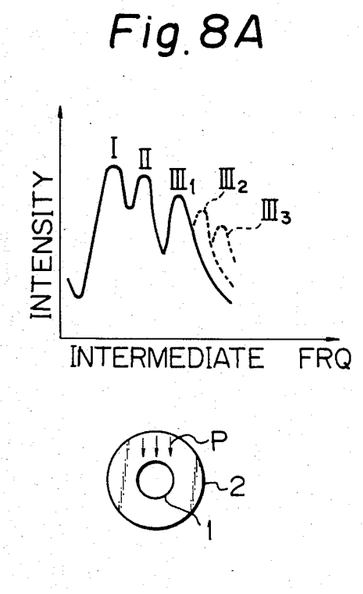
FIG. 8A is a graph for explaining the intensity of an electromagnetic wave at the TEM mode.
Figure 8B:
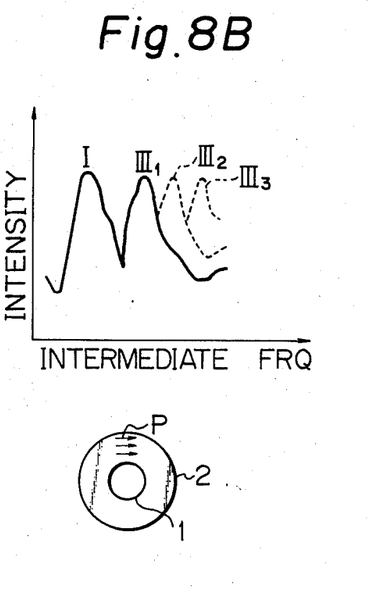
FIG. 8B is a graph for explaining the intensity of an electromagnetic wave at the $TE_{01}$ mode.

FIG. 8A, FIG. 8B, and FIG. 9 are graphs for explaining resultant data, i.e., effects according to the present invention. Experiments were conducted with a double pipe constituted by an inner pipe 1 having an outer diameter of 85 mm and an outer pipe 2 having an inner diameter of 265 mm. The transmitting horn antenna 8 and the receiving horn antenna 9 were emplaced at the gap 6 between the inner pipe 1 and the outer pipe 2. A frequency-modulated electromagnetic wave of 10 GHz was radiated from the transmitting horn antenna 8 to the gap 6, and the wave reflected by the surface of the water level was received by the receiving horn antenna 9. The transmitted wave and the received wave were mixed in the mixer 14 and the difference between the frequency of the transmitted wave and the received wave, i.e., the intermediate frequency, were measured in the spectrum analyzer 15. As a result, an intermediate frequency proportional to the distance between the horn antenna and the water level was obtained. In this case, the experiments were performed by changing the water level and the electromagnetic wave mode to obtain various data on attenuation and the like.

FIG. 8A indicates the case of the TEM mode, and FIG. 8B indicates the case of the $TE_{01}$ mode. In both drawings, the ordinate indicates the intensity of the intermediate frequency and the abscissa the intermediate frequency. The peak I indicates the reflection intensity between the transmitting horn antenna 8 and receiving horn antenna 9, the peak II the reflection intensity from the joint portion of the pipe, and the peak III the reflection intensity from the surface of the water level. Reference P indicates the polarized wave surface, illustrated by arrow lines.

As obvious from the drawings, in the TEM mode (FIG. 8A), the peaks $III_1$, $III_2$, and $III_3$ (peaks necessary to measure the distance of the water level) gradually decrease in intensity as the intermediate frequency increases, namely, attenuation of the electromagnetic wave is considerably large. Moreover, an unnecessary peak II which impedes measurement is very large. In the $TE_{01}$ mode (FIG. 8B), the peaks $III_1$, $III_2$, and $III_3$ become approximately flat as the intermediate frequency increases, namely no attenuation of the electromagnetic wave appears. Moreover, no unnecessary peak II appears at any intermediate frequency.

Referring to FIG. 9, the ordinate indicates the distance (m) between the horn antenna and the water level in the well, and the abscissa indicates the intermediate peak frequency (kHz). In this case, the inner diameter of the outer pipe 2 is 318.5 mm and the outer diameter of the inner pipe 1 is 114.3 mm. As is obvious from the graph, it is possible to measure the distance within an error of 1 percent.

We claim:

1. A method for measuring a water level in a well, such as a geothermal well, oil well, and the like, during drilling, said method comprising the steps of:
    radiating an electromagnetic wave having a selected wavelength into a gap between a boring drill rod and a casing pipe by using a transmitting antenna;
    receiving said electromagnetic wave reflected by a surface of said water level in said casing pipe by using a receiving antenna; and
    measuring a distance between said surface of said water level and said receiving antenna based on the going and returning time of said electromagnetic wave,
    wherein said selected wavelength of said electromagnetic wave to be used is longer than said gap distance between said boring drill rod and said casing pipe and said transmitting and receiving are performed by using a transverse electromagnetic (TEM) mode of electromagnetic wave.

2. A method as claimed in claim 1, wherein said measuring is performed by mixing said radiated electromagnetic wave with said received electromagnetic wave and by analyzing an intermediate frequency obtained from said mix.

3. A method as claimed in claim 1, wherein said electromagnetic wave is frequency-modulated.

4. A method as claimed in claim 2, wherein said electromagnetic wave is frequency-modulated.

5. A method as claimed in claim 1, wherein said measuring is performed by detecting a delay time between said radiated electromagnetic wave and said received electromagnetic wave.

6. An apparatus for measuring a water level in a well, such as a geothermal well, oil well, and the like, during drilling, said apparatus comprising:
    a transmitting antenna mounted to the top of a casing pipe in a gap between a boring drill rod and said casing pipe;
    a receiving antenna mounted to the opposite side of said transmitting antenna in said gap;
    a transmitter-receiver electrically connected to said transmitting antenna and said receiving antenna for transmitting and receiving said electromagnetic wave;
    a spectrum analyzing means for analyzing mixed transmitted and received electromagnetic waves; and
    a recording means for recording analyzed data.

7. An apparatus as claimed in claim 6, wherein said transmitting antenna comprises a horn antenna.

8. An apparatus as claimed in claim 6, wherein said receiving antenna comprises a horn antenna.

9. An apparatus as claimed in claim 6, wherein said transmitter-receiver comprises a sweep oscillator generating a frequency-modulated electromagnetic wave, a directional coupler for splitting said electromagnetic wave into two electromagnetic waves, an amplifier for amplifying one electromagnetic wave transmitted from said directional coupler, and a mixer for mixing the other transmitted electromagnetic wave with a received electromagnetic wave.

10. An apparatus as claimed in claim 6, wherein said spectrum analyzing means comprises a spectrum analyzer.

11. An apparatus for measuring a water level in a well, such as a geothermal well, oil well, and the like, during drilling, said apparatus comprising:
   a transmitting electrode mounted to a boring drill rod;
   a receiving electrode mounted to a casing pipe;
   a pulse oscillator for generating a pulse-modulated electromagnetic wave;
   a spectrum analyzing means for measuring a delay time between a transmitted pulse and received pulse; and
   a recording means for recording measured data.

12. An apparatus as claimed in claim 11, wherein positive potential is applied to said transmitting electrode.

13. An apparatus as claimed in claim 11, wherein negative potential is applied to said receiving electrode.

14. A method for measuring a water level in a well, such as a geothermal well, oil well, and the like, during drilling, said method comprising the steps of:
   radiating an electromagnetic wave having a selected wavelength into a gap between a boring drill rod and a casing pipe by using a transmitting antenna;
   receiving said electromagnetic wave reflected by a surface of said water level in said casing pipe by using a receiving antenna; and
   measuring a distance between said surface of said water level and said receiving antenna based on the going and returning time of said electromagnetic wave,
   wherein said selected wavelength of said electromagnetic wave to be used is shorter than said gap distance between said boring drill rod and said casing pipe and said transmitting and receiving are performed by using a transverse electric (TE) mode of electromagnetic wave.

15. A method as claimed in claim 14, wherein said transmitting and receiving are performed by using a $TE_{01}$ mode of electromagnetic wave.

16. A method as claimed in claim 15, wherein said measuring is performed by mixing said radiated electromagnetic wave with said received electromagnetic wave and by analyzing an intermediate frequency obtained from said mix.

17. A method as claimed in claim 15, wherein said electromagnetic wave is frequency-modulated.

18. A method as claimed in claim 16, wherein said electromagnetic wave is frequency-modulated.

19. A method as claimed in claim 15, wherein said measuring is performed by detecting a delay time between said radiated electromagnetic wave and said received electromagnetic wave.

20. A method for measuring a water level in a well, such as a geothermal well, oil well, and the like, during drilling, said method comprising the steps of:
   radiating a pulse-modulated electromagnetic wave into a gap between a boring drill rod and a casing pipe,
   receiving said electromagnetic wave reflected by a surface of said water level in said casing pipe, and
   measuring a position of said water level based on a delay time between a transmitted pulse and received pulse.

* * * * *